(12) United States Patent  
Sampath et al.

(10) Patent No.: US 8,979,445 B2  
(45) Date of Patent: Mar. 17, 2015

(54) CUTTING TIP AND ROTARY CUTTING TOOL EMPLOYING SAME

(75) Inventors: Karthik Sampath, Pittsburgh, PA (US); Vladimir Volokh, Maa'lot-Tarshiha (IL)

(73) Assignee: Hanita Metal Factory Ltd, Latrobe, PA (US)

( * ) Notice: Subject to any disclaimer, the term of this patent is extended or adjusted under 35 U.S.C. 154(b) by 666 days.

(21) Appl. No.: 12/905,427

(22) Filed: Oct. 15, 2010  
(Under 37 CFR 1.47)

(65) Prior Publication Data

US 2012/0093600 A1  Apr. 19, 2012

(51) Int. Cl.  
*B23B 51/02*  (2006.01)

(52) U.S. Cl.  
CPC ............. *B23B 51/02* (2013.01); *B23B 2251/04* (2013.01); *B23B 2251/082* (2013.01); *B23B 2251/085* (2013.01); *B23B 2251/14* (2013.01); *B23B 2251/18* (2013.01)  
USPC .......................................... 408/224; 408/225

(58) Field of Classification Search  
USPC .......................................... 408/223, 224, 225  
See application file for complete search history.

(56) References Cited

U.S. PATENT DOCUMENTS

| | | | |
|---|---|---|---|
| 1,309,706 A | | 7/1919 | Taylor |
| 2,332,295 A | | 10/1943 | Bouchal |
| 2,334,845 A | * | 11/1943 | Schwartz ...................... 408/224 |
| 3,045,513 A | | 7/1962 | Andreasson |
| 3,207,196 A | * | 9/1965 | Stillwagon, Jr. ............. 408/229 |
| 3,443,459 A | | 5/1969 | Mackey et al. |
| 3,779,664 A | * | 12/1973 | Caley et al. ................... 408/225 |
| 4,064,784 A | | 12/1977 | Adler |
| 4,116,580 A | | 9/1978 | Hall et al. |
| 4,123,186 A | | 10/1978 | Hoadley |
| 4,209,275 A | | 6/1980 | Kim |
| 4,330,229 A | | 5/1982 | Croydon |

(Continued)

FOREIGN PATENT DOCUMENTS

| | | |
|---|---|---|
| CN | 2157860 Y | 3/1994 |
| CN | 1107409 A | 8/1995 |

(Continued)

OTHER PUBLICATIONS

United Kingdom Intellectual Property Office, "Search Report under Section 17(5)", Feb. 13, 2012, 4 pp.

(Continued)

*Primary Examiner* — Daniel Howell  
*Assistant Examiner* — Chwen-Wei Su  
(74) *Attorney, Agent, or Firm* — Larry R. Meenan

(57) ABSTRACT

A rotary cutting tool includes a first end defined by a cutting profile and structured to perform cutting operations on a workpiece. The cutting tool also includes an opposite second end structured to be mounted in a machine tool, a central longitudinal axis extending between the first and second ends, and a generally cylindrical body disposed about the central longitudinal axis between the first end and the opposite second end. The cutting profile includes a first portion adjacent the central longitudinal axis and disposed generally at a first angle relative to the central longitudinal axis; a second portion adjacent the first portion and disposed generally at a second angle relative to the central longitudinal axis; and a third portion adjacent the second portion and disposed generally at a third angle relative to the central longitudinal axis. The second angle is greater than both the first and third angles.

13 Claims, 4 Drawing Sheets

(56) References Cited

U.S. PATENT DOCUMENTS

| | | | |
|---|---|---|---|
| 4,602,900 A | | 7/1986 | Arpaio, Jr. et al. |
| 5,273,380 A | * | 12/1993 | Musacchia ............... 408/230 |
| 5,685,673 A | | 11/1997 | Jarvis |
| 5,980,169 A | | 11/1999 | Hinch |
| 6,443,674 B1 | * | 9/2002 | Jaconi ..................... 408/1 R |
| 7,140,815 B2 | * | 11/2006 | George et al. ............ 408/230 |
| 7,520,703 B2 | * | 4/2009 | Rompel ................... 408/225 |
| 7,556,459 B2 | * | 7/2009 | Rompel ................... 408/204 |
| 8,061,938 B2 | * | 11/2011 | Sampath et al. .......... 408/230 |
| 2002/0046885 A1 | | 4/2002 | Eichhorn et al. |
| 2003/0017015 A1 | * | 1/2003 | Strubler .................. 408/230 |
| 2003/0202853 A1 | * | 10/2003 | Ko et al. ................. 408/225 |

FOREIGN PATENT DOCUMENTS

| | | |
|---|---|---|
| CN | 1211206 A | 3/1999 |
| CN | 1556734 A | 12/2004 |
| CN | 1894063 A | 1/2007 |
| CN | 101524768 A | 9/2009 |
| CN | 101549411 A | 10/2009 |
| CN | 101767216 A | 7/2010 |
| DE | 10 2008 049 509 A1 | 3/2010 |
| EP | 1389502 A1 | 2/2004 |
| EP | 2 390 028 A1 | 11/2011 |
| GB | 454916 | 10/1936 |
| GB | 2480011 A | 2/2011 |
| WO | 2008/082822 A2 | 7/2008 |
| WO | 2009/114353 A2 | 9/2009 |

OTHER PUBLICATIONS

UK Intellectual Property Office, "Further Search Report under Section 17", Jul. 3, 2012, 2 pp.
Zhu, Shuping; China Machine Press, China, "Mechanical Processing Technology and Equipment," ISBN: 9787111093428; the Second Edition, Apr. 30, 2007, pp. 85-89.
11-19-2014-K-2706USCN1_Second_Office_Action.pdf.

* cited by examiner

CUTTING TIP AND ROTARY CUTTING TOOL EMPLOYING SAME

BACKGROUND

1. Field of the Invention

The invention relates generally to rotary cutting tools and, more particularly, to cutting tips for rotary cutting tools.

2. Background Information

Rotary cutting tools, such as the fluted drill 10 shown in FIGS. 1 and 2, are known. Such drills are commonly formed including a cutting tip 12 located at or near a first end 14, a mounting portion 16 located at or near a second end 18, and a body portion 20 disposed about a central longitudinal axis 22 which extends generally between the first end 14 and the second end 18. Body portion 20 is of generally cylindrical shape and includes a number of helical flutes 24 disposed therein.

Cutting tip 12 is structured to perform cutting operations on a workpiece (not shown), which, in the case of fluted drills, include hole-cutting operations. To aid in the performance of such cutting operations, it is known to provide the cutting tip 12 with a straight tapered profile 26 (FIG. 2) generally disposed at an angle σ relative to the central longitudinal axis 22.

Although such cutting tips having straight tapered profiles have been generally suitable in many applications, there still exists room for improvement. For example, when performing hole-cutting operations on many materials, maintaining a clean surface finish is often critical. Engineered materials, such as carbon fiber reinforced polymers (CFRPs) particularly present such a challenge. Known drill designs are typically either incapable of producing such desired surface finishes or else are incapable of doing so for a satisfactory service life.

There is, therefore, a need for improved cutting tip profiles for cutting engineered materials.

SUMMARY OF THE INVENTION

Such deficiencies in the prior art are addressed by embodiments of the invention which are directed to an improved cutting tip and a rotary cutting tool incorporating an improved cutting tip.

As one aspect of the invention, a rotary cutting tool for performing hole-cutting operations on a workpiece is provided. The rotary cutting tool comprises: a first end structured to engage and perform cutting operations on the workpiece, the first end being defined by a cutting profile; an opposite second end structured to be mounted in a machine tool; a central longitudinal axis extending between the first end and the opposite second end; and a generally cylindrical body disposed about the central longitudinal axis between the first end and the opposite second end, the generally cylindrical body having an outer surface. The cutting profile comprises: a first portion adjacent the central longitudinal axis and disposed generally at a first angle relative to the central longitudinal axis; a second portion adjacent the first portion and disposed generally at a second angle relative to the central longitudinal axis; and a third portion adjacent the second portion and disposed generally at a third angle relative to the central longitudinal. The second angle is greater than the first angle and the second angle is greater than the third angle.

The first angle may be in the range of about 30 degrees to about 35 degrees. The second angle may be about 60 degrees. The third angle may be in the range of about 40 degrees to about 50 degrees.

As another aspect of the invention, an improved cutting tip for use with a cutting tool for performing hole-cutting operations on a workpiece when the cutting tool and cutting tip are rotated about a central longitudinal axis is provided. The cutting tip comprises: a first portion disposed generally at a first angle relative to the central longitudinal axis; a second portion adjacent the first portion and disposed generally at a second angle relative to the central longitudinal axis; and a third portion adjacent the second portion and disposed generally at a third angle relative to the central longitudinal axis. The second angle is greater than the first angle and the second angle is greater than the third angle.

The first portion may be disposed adjacent the central longitudinal axis. The second portion and the third portion may be disposed radially outward from the first portion. The third portion may be disposed radially outward from the second portion. The first angle may be in the range of about 30 degrees to about 35 degrees. The second angle may be about 60 degrees. The third angle may be in the range of about 40 degrees to about 50 degrees.

As another aspect of the invention, an improved cutting tip for use with a cutting tool for performing hole-cutting operations on a workpiece when the cutting tool and cutting tip are rotated about a central longitudinal axis is provided. The cutting tip comprises a concave shaped portion and a convex shaped portion.

The convex portion may be disposed radially outward from the concave portion.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
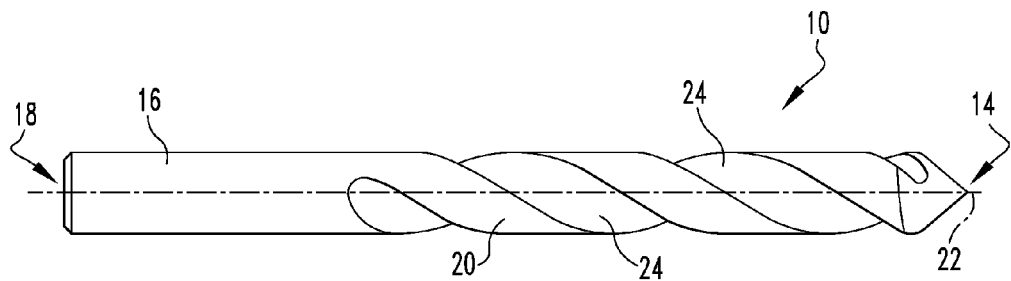
FIG. 1 is an isometric view of a known rotary cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e. one or any quantity greater than one).

Figure 3:
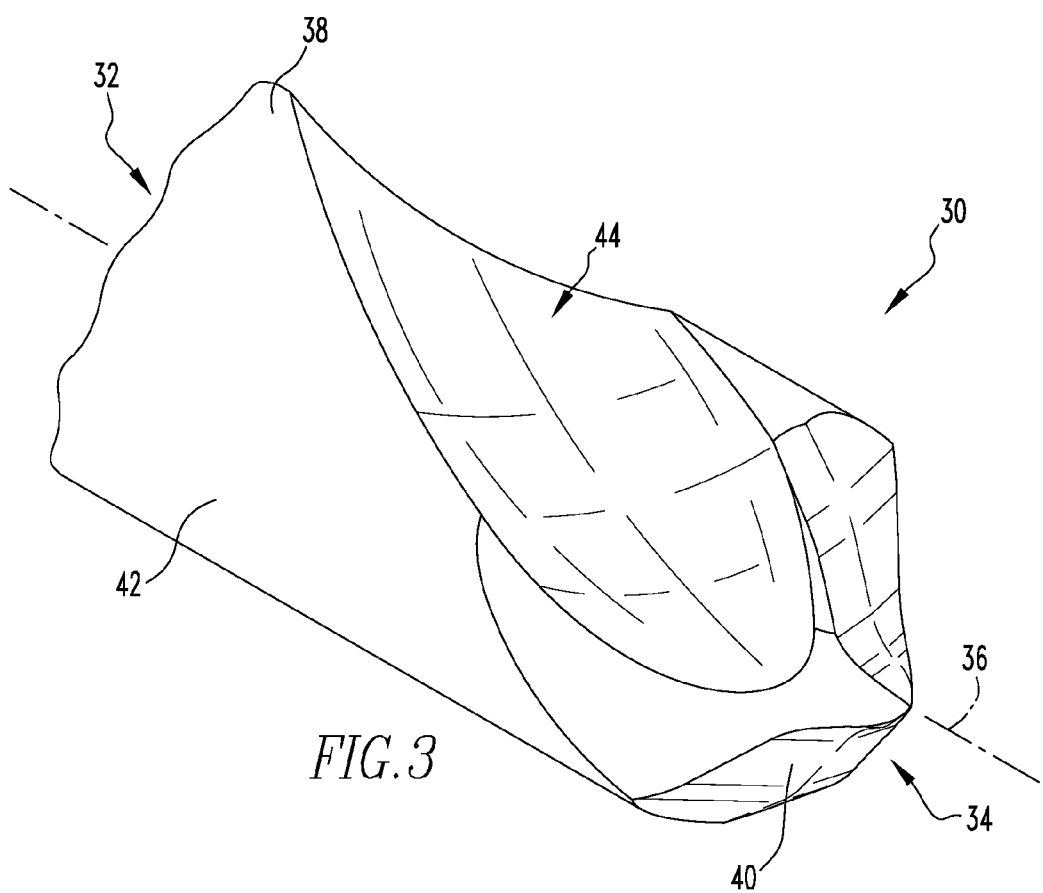
FIG. 3 is an isometric view of a rotary cutting tool in accordance with an embodiment of the present invention.
Figure 4:
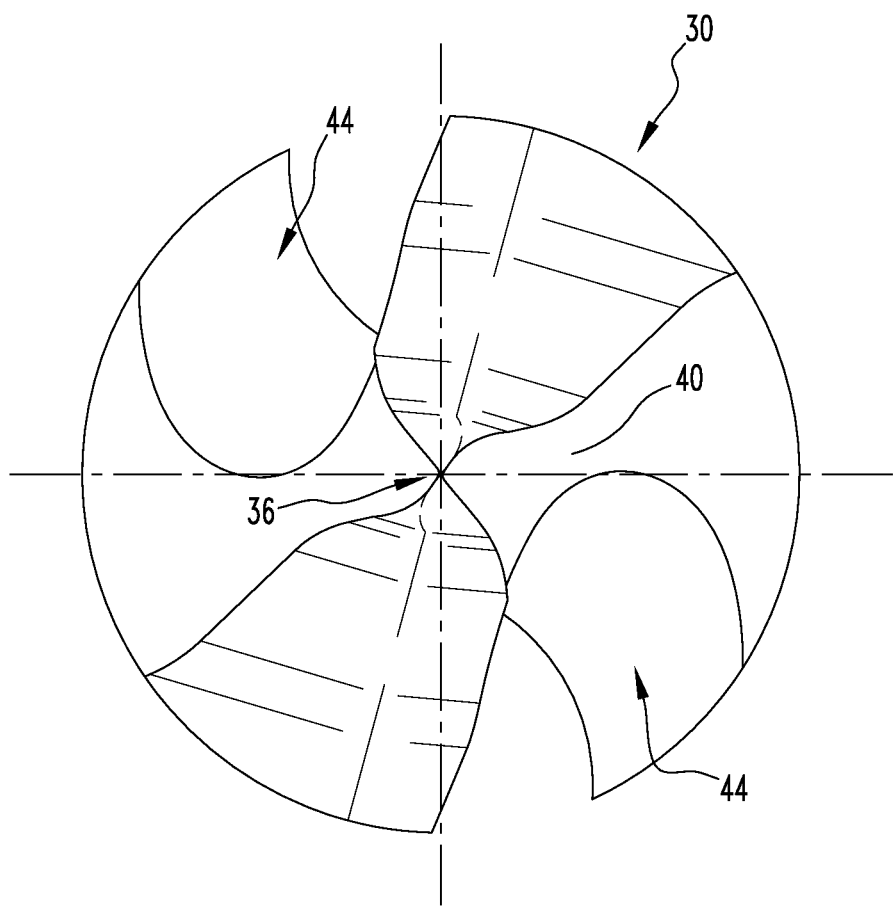
FIG. 4 is an elevational end view of the rotary cutting tool of FIG. 3 looking down the longitudinal axis of the tool toward the second end.
Figure 5:
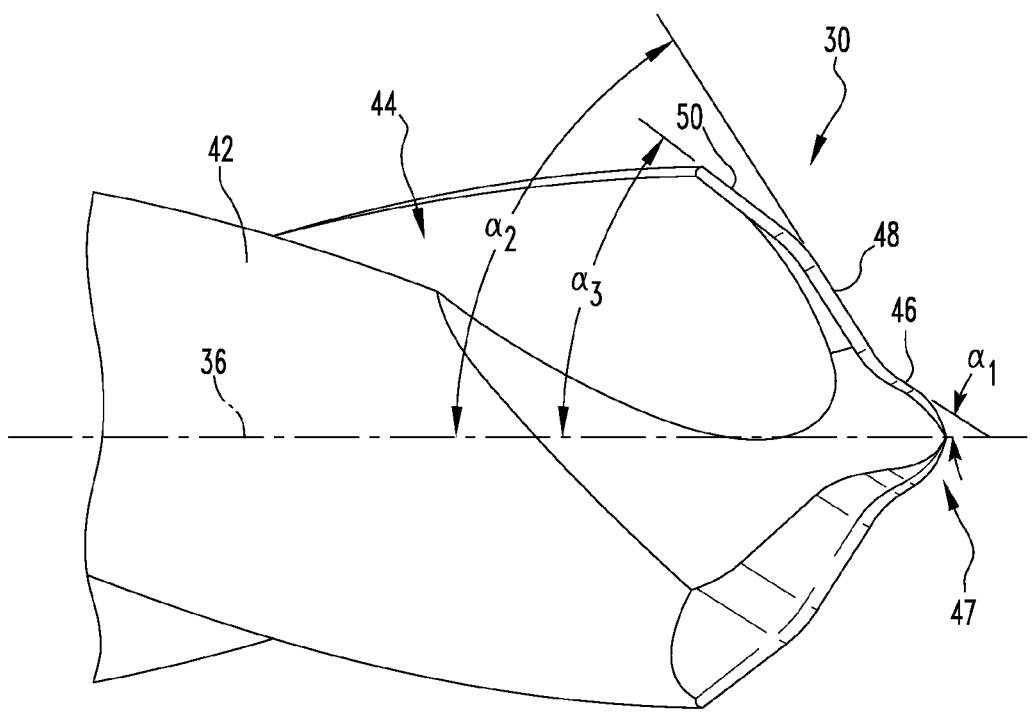
FIG. 5 is an elevational side view of the cutting tip of the rotary cutting tool of FIG. 3.

FIGS. 3-5 depict an example rotary cutting tool 30, in accordance with a non-limiting embodiment of the invention, for conducting rotary cutting operations on a workpiece (not shown) when cutting tool 30 is rotated about a central longitudinal axis 36. Rotary cutting tool 30 includes a first end 32 and an opposite second end 34. Although cutting tool 30 is shown in the form of a drill, it is to be appreciated that the concepts described herein may also be applied to other rotary cutting tools such as, for example, modular drills and spade drills.

Referring to FIG. 3, similar to the fluted drill 10 previously discussed, cutting tool 30 includes a mounting portion 38 disposed at or near first end 32 for mounting the cutting tool 30 in a chuck mechanism (not shown) of a machine tool, a cutting tip 40 generally disposed at second end 34 for engaging and cutting a workpiece (not shown), and a body portion 42 of generally cylindrical shape disposed between the mounting portion 38 and cutting tip 40. A number of flutes 44, preferably helical in shape, are provided in body portion 42.

Figure 2:
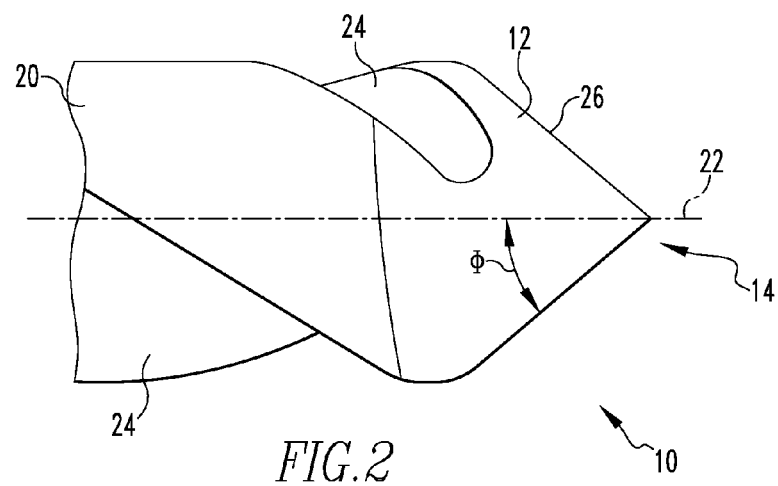
FIG. 2 is an elevational side view of a portion of the rotary cutting tool of FIG. 1 showing the profile of the cutting tip.

Unlike the cutting tip 12 of fluted drill 10 previously discussed which utilizes a straight tapered profile 26 (FIG. 2), cutting tip 40 of cutting tool 30 utilizes a non-linear cutting profile having a generally concave-convex profile formed from a number of portions oriented at different angles. As shown in the side elevational view of FIG. 5, the cutting profile includes a first portion 46 adjacent the central longitudinal axis 36 disposed generally at a first angle $\alpha 1$ relative to central longitudinal axis 36. Such first portion 46 generally defines a tip 47 of the cutting tool that first contacts a workpiece. Preferably, $\alpha 1$ is in the range of about 30 degrees to about 35 degrees. By providing a relatively steep tip 47 (and thus a relatively small tip diameter), the cutting tool 30 is able to easily penetrate an engineered material.

The profile further includes a second portion 48 disposed generally at a second angle $\alpha 2$ relative to central longitudinal axis 36. Such second portion 48 generally defines a transition zone between the tip 47 and the body portion 42.

Preferably, $\alpha 2$ is greater than $\alpha 1$, generally about 60 degrees so as to provide a strong transition zone.

A third portion 50 disposed generally at a third angle $\alpha 3$ relative to central longitudinal axis 36 generally concludes the cutting profile. The third portion generally serves to provide reduced pressure on the corners of a hole being machined in a workpiece (not shown). Such reduced pressure help to reduce delamination of the workpiece being machined. Preferably, $\alpha 3$ is less than $\alpha 2$, generally in the range of about 40 degrees to about 50 degrees.

Continuing to refer to FIG. 5, it can be appreciated that first and second portions 46, 48 form a generally concave shaped portion in cutting tip 40, while second and third portions 48, 50 form a generally convex portion in cutting tip 40.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof

What is claimed is:

1. A rotary cutting tool for performing hole-cutting operations on a workpiece, the rotary cutting tool comprising:
    a first end structured to engage and perform cutting operations on the workpiece, the first end being defined by a cutting profile;
    an opposite second end structured to be mounted in a machine tool;
    a central longitudinal axis extending between the first end and the opposite second end; and
    a generally cylindrical body disposed about the central longitudinal axis between the first end and the opposite second end, the generally cylindrical body having an outer surface,
    wherein the cutting profile comprises:
        a first portion adjacent the central longitudinal axis and disposed generally at a first angle relative to the central longitudinal axis;
        a second portion adjacent the first portion and disposed generally at a second angle relative to the central longitudinal axis; and
        a third portion adjacent the second portion and disposed generally at a third angle relative to the central longitudinal,
    wherein the first portion defines a portion of a convexly shaped tip portion disposed about the central longitudinal axis of the cutting tool, and
    wherein the second angle is greater than the first angle and the second angle is greater than the third angle.

2. The rotary cutting tool of claim 1 wherein the first angle is in the range of about 30 degrees to about 35 degrees.

3. The rotary cutting tool of claim 1 wherein the second angle is about 60 degrees.

4. The rotary cutting tool of claim 1 wherein the third angle is in the range of about 40 degrees to about 50 degrees.

5. The rotary cutting tool of claim 1 wherein the second portion comprises a straight portion and wherein the third portion comprises a straight portion.

6. An improved cutting tip for use with a cutting tool for performing hole-cutting operations on a workpiece when the cutting tool and cutting tip are rotated about a central longitudinal axis, the cutting tip comprising:
    a first portion disposed generally at a first angle relative to the central longitudinal axis;
    a second portion adjacent the first portion and disposed generally at a second angle relative to the central longitudinal axis; and
    a third portion adjacent the second portion and disposed generally at a third angle relative to the central longitudinal axis,
    wherein the first portion defines a portion of a convexly shaped tip portion disposed about the central longitudinal axis of the cutting tool, and
    wherein the second angle is greater than the first angle and the second angle is greater than the third angle.

7. The cutting tip of claim 6 wherein the first portion is disposed adjacent the central longitudinal axis.

8. The cutting tip of claim 7 wherein the second portion and the third portion are disposed radially outward from the first portion.

9. The cutting tip of claim 8 wherein the third portion is disposed radially outward from the second portion.

10. The cutting tip of claim 6 wherein the first angle is in the range of about 30 degrees to about 35 degrees.

11. The cutting tip of claim 6 wherein the second angle is about 60 degrees.

12. The cutting tip of claim 6 wherein the third angle is in the range of about 40 degrees to about 50 degrees.

13. The cutting tip of claim 6 wherein the second portion comprises a straight portion and wherein the third portion comprises a straight portion.

* * * * *